United States Patent Office 3,532,490
Patented Oct. 6, 1970

3,532,490
PRODUCTION OF METAL POWDERS
AND COATINGS
Alfred Richard Burkin, Shenfield, Essex, England, assignor to National Research Development Corporation, London, England, a corporation of Great Britain
No Drawing. Filed Jan. 18, 1968, Ser. No. 698,720
Claims priority, application Great Britain, Jan. 24, 1967, 3,565/67
Int. Cl. C22b 15/12, 23/04; B22f 9/00
U.S. Cl. 75—.5      21 Claims

ABSTRACT OF THE DISCLOSURE

The invention provides a process for the deposition of a metal value, e.g. the pure metal or a compound of the metal such as an oxide, which comprises contacting with a reducing gas a liquid organic medium containing a metal species in a compound of or in association with an organic extractant to cause precipitation of a metal value from the organic phase, there being also present, when the metal species is more electropositive than cadmium, an acid acceptor.

---

This invention relates to the deposition of metal values.

It is known that metals such as nickel, cobalt and copper can be precipitated in the form of powders and coatings from aqueous solutions of their salts with hydrogen gas. It has, however, proved impossible to precipitate metals more electropositive than cadmium from aqueous solutions by this method. In the recovery of metals from aqueous solutions derived by treatment of their ores or from wastes extensive use is now made of solvent extraction techniques in which the metal is extracted into a liquid phase containing an organic extractant. The metal is then recovered by contacting the liquid phase with a suitable aqueous stripping solution and recovering the metal from the resulting aqueous solution. It has now been found possible to precipitate metals from an organic phase, thus providing a more direct and considerably simplified process for their recovery and one which is applicable to certain metals more electropositive than cadmium.

According to the present invention, a process for the deposition of a metal value comprises contacting with a reducing gas, e.g. hydrogen or carbon monoxide, a liquid organic medium containing a metal species in a compound of or in association with an organic extractant to cause precipitation of a metal value from the organic phase, there being also present, when the metal species is more electropositive than cadmium, an acid acceptor.

The limitations of this invention, as regards the metals to which it may be applied, are determined in part by thermodynamic considerations and also by the extractants employed which are themselves to some extent selective as to the metals with which they will form compounds and complexes. The invention is applicable to metals of Groups I(b) and VIII of the Periodic Table and may also be employed for the recovery of cadmium, vanadium, uranium molybdenum and tungsten although the two last mentioned metals are somewhat refractory. Other metals may also be precipitated in the manner described.

The reaction can be carried out in an autoclave at ambient temperature for certain metals e.g. Pt (III) but, more usually, at elevated temperature, preferably about 115° C., for example, 200° C., and at pressures preferably above 200 p.s.i. for example, 500 to 700 p.s.i. In the case of certain metals e.g. nickel, cobalt and iron it is desirable, for best results, to employ a seed material, e.g. a finely divided metal power, palladised carbon, colloidal graphite or other form of carbon dispersed in an organic liquid.

The organic extractant employed is a substance capable of forming a compound or complex with the metal and may be one of the extractants conventionally used in organic solvent extraction of metals. Thus the extractant may be a material of suitable properties selected from the classes of amines, amine salts, organic phosphates, phosphites or phosphonates, alkyl phosphoric acids, and carboxylic acids. The following are particularly suitable extractants:

Tri-iso-octylamine, methyldioctylamine, didecylamine, "tricapyrlylyamine," methyltrioctylammonium salt, tri-n-butyl phosphate, di-(2-ethylhexyl)-hydrogen phosphate and preferably carboxylic acids. Tertiary carboxylic acids are the preferred extractants. They are resistant to reduction, and the acids and their metal salts are soluble in organic solvents. The mixture of acids known as "Versatic 9–11" is particularly suitable. This is a mixture of carboxylic acids having 9, 10, and 11 carbon atoms and containing secondary and tertiary acids in the proportion, approximately, 10% to 90%. The mixture contains no primary acids.

The extractants are, for the most part, liquids at the temperatures at which reduction is accomplished and if used in excess provide the liquid medium in which the process of the invention is carried out. Alternatively, other suitable liquid organic diluents may be employed, to provide a dispersion, e.g. a true solution of the metal derivative and this method of operation is usually preferred. Such a diluent is preferably high-boiling and inert to the reducing gas employed, but in case where a reducible diluent has other properties which makes its use desirable it may be used and subsesuently dehydrogenated, for example, while being recycled. For practical convenience the vapour pressure of the diluent is preferably low at the working temperature, and its viscosity is preferably low at room temperature. The metal will usually be extracted into the organic phase from an aqueous solution and under these conditions the use of diluents having an unduly high water solubility will, of course, be avoided. Open chain hydrocarbons such as "Shellsol-T", cycloaliphatic hydrocarbons, aromatic hydrocarbons such as "Shellsol-AB," halogenohydrocarbons such as 1,2-dichloroethane and long chain alcohols may be used as diluents.

The organic phase may be produced in various ways. The simplest method is by extraction of the metal from an aqueous solution of an inorganic salt such as a sulphate, nitrate or chloride to a solution of the extractant in the organic medium adjusting the pH as necessary.

When an organic acid is used as the extractant a solution of the organic acid in a hydrocarbon as diluent can, for example, be equilibrated with an aqueous solution of an alkali such as sodium hydroxide, sodium carbonate or ammonia to form the sodium or ammonium salt of the acid. The organic solution of this salt in the diluent is mixed with the aqueous solution of an inorganic salt of the metal, and the addition of quite a small amount of additional alkali causes the metal to pass into the organic phase. Alternatively, the organic solution of the acid can be added to the aqueous solution of the inorganic salt of the metal, and the whole of the necessary amount of an aqueous solution of the alkali added to the mixture.

In some circumstances a precipitate of metal hydroxide may form or a layer of emulsion may be produced. The ratio of organic acid to inorganic salt and the quantity and nature of the alkali should be controlled so as to prevent this happening as far as possible.

When an amine or a phosphorus compound is used as the extractant there may be added to the aqueous solution of the inorganic salt of the metal a suitable reagent to convert the metal to an extractable species, e.g. a complex anion or a neutral sepcies, before extraction into the organic phase. For example, when the metal is cobalt, 8-molar hydrochloric acid may be used as the reagent. In some cases this may lead to the formation of a third phase and it may be desirable to add an alcohol of low water solubility to prevent third phase formation.

When the metal species is more electropositive than cadmium the reaction must be carried out in the presence of an acid acceptor, such as ammmonia or an organic amine or other basic substance. Thus, for example, ammonia gas or other reagent may be added to the autoclave.

The metal value which is deposited is often the pure metal, but in some cases the metal value is a compound of the metal, such as an oxide.

The following examples illustrate the invention:

EXAMPLE 1

Stage 1.

1200 cc. of a mixture of 2 vols of Shellsol T and 1 vol. of Versatic 911 is shaken with an aqueous solution of 280 g. of nickel sulphate, approximately $NiSO_4$—$7H_2O$, made up to 1200 cc. in water. Sufficient sodium hydroxide is added to cause nickel to extract into the organic phase and leave a small amount of a precipitate of basic nickel sulphate or nickel hydroxide in suspension after shaking for a further period of 1 hour. The mixture is allowed to separate and the lower aqueous layer is run off. The organic layer is filtered through a filter paper under vacuum.

Stage 2

The organic solution of the nickel salt of the Versatic acid and excess acid is put into a dry autoclave and 10 g. of nickel powder of particle size about 4 microns is added. The autoclave is closed, the stirrer switched on, the temperature raised to 200° C. and hydrogen is then fed in from a cylinder of the compressed gas until the pressure in the autoclave has increased by 700 p.s.i. The gas supply is then cut off. After 1 hour the heaters are turned off and the autoclave cooled by compressed air. The contents of the autoclave are removed, the liquid filtered and the metal powder is washed with alcohol. Nickel precipitates quantitatively, mostly as powder, but some is deposited on metallic surfaces in the autoclave.

EXAMPLE 2

Palladised carbon is prepared as follows (Organic Syntheses Collective Volume 3) for use as seed. Finely divided carbon is heated with 10% nitric acid on a steam bath for 2 hours, washed free of acid and dried at 105° C. A suspension of 93 g. of the carbon in 1200 cc. of water is heated to 80° C. and to it is added a solution of 8.2 g. of palladium chloride in 20 cc. of concentrated hydrochloric acid and 50 cc. of water. 8.0 cc. of 37% formaldehyde is added; the mixture is stirred continuously while 30% sodium hydroxide is added until the solution is slightly alkaline. The solid is washed well with water, spread out thinly on a glass sheet and allowed to dry in air at room temperature. It is finally dried over potassium hydroxide in a desiccator and stored in a tightly closed bottle.

The procedure of Example 1 is repeated except that the 10 g. of nickel powder is not added in stage 2. Instead 2 g. of palladised carbon seed is added. Nickel deposits quantitatively, mostly as powder, but some is deposited on metallic surfaces in the autoclave.

EXAMPLE 3

The procedure of Example 1 is repeated except that the temperature of reduction in stage 2 is 180° C., not 200° C. Some nickel powder is produced on the seed, some is deposited on metallic surfaces in the autoclave, and some nickel remains in solution.

EXAMPLE 4

The procedures of Examples 1 to 3 are repeated except that 300 g. of cobaltous sulphate, $CoSo_4 \cdot 7H_2O$, is used in stage 1 instead of nickel sulphate. The results of reduction under the different conditions are identical with those reported for nickel.

EXAMPLE 5

Stage 1

A 2 molar ferrous sulphate solution in water is prepared and sulphuric acid added to give a pH between 1.5 and 2.0. About 0.5 g. of iron powder is added and the mixture allowed to stand for at least 3 hours. The iron reduces ferric ions to ferrous in the aqueous liquor. The solid is filtered off under vacuum and the liquid is immediately shaken with a mixture of 404 cc. of Versatic 911 and 800 cc. of Shellsol T, 2 N sodum hydroxide solution being added to maintain the pH necessary for efficient extraction of iron into the organic phase. The two liquid layers are allowed to separate completely and the dark brown solution of iron in the organic solvent is separated from the olive green aqueous layer, which contains residual iron. Ammonia or sodium carbonate can be used instead of sodium hydroxide.

Stage 2

The iron-containing organic solution from stage 1 is placed in an autoclave with 10 g. of 5 micron nickel powder. Ammonia gas is admitted until the pressure reaches 80 p.s.i., the gas supply is turned off and the stirrer in the autoclave is switched on. The pressure falls as ammonia dissolves in the liquid and when it reaches a steady value the stirrer is switched off and ammonia gas is admitted until the pressure reaches 80 p.s.i. The pressure is increased by 350 p.s.i. with hydrogen, the temperature raised to 200° C. and after 2 hours at this value, to 250° C. After 2 hours the vessel is cooled. 18 g. of powder is recovered, which is found by analysis to contain about 45% nickel and about 55% iron. Some powder remains attached to the metal surfaces within the autoclave.

EXAMPLE 6

405 cc. of Versatic 5 (pivalic acid $(CH_3)_3C \cdot COOH$) is mixed with 800 cc. Shellsol T and loaded with copper from 1 M cupric sulphate solution, using sodium hydroxide to obtain the necessary pH. The very dark green organic layer is transferred to an autoclave, heated to 200° C., 500 p.s.i. of hydrogen is added, and after 2 hours the vessel is cooled. Copper metal powder is present, no copper remains in the solution which does, however, contain some iron. The iron is present because Versatic 5 in Shellsol T attacks 18–8 stainless steel at temperatures around 100° C.

EXAMPLE 7

350 g. of lauric acid, $CH_3(CH_2)_{10}COOH$, normal reagent grade, is dissolved in 800 cc. of Shellsol T at 40° C. and loaded with nickel from 1 M nickel sulphate solution using sodium carbonate to adjust the pH. The organic layer is transferred to an autoclave, 5 g. of 5 micron nickel powder is added as seed, the temperature taken to 200° C., 350 p.s.i. of hydrogen added, and after 3 hours the vessel is cooled. Nickel metal powder is present, no nickel remains in the solution, from which lauric acid crystallises on cooling. Almost no nickel is deposited on the metal surfaces of the autoclave.

EXAMPLE 8

The procedure of stage 1 of Example 1 is repeated except that the nickel sulphate is replaced by 300 g. of cupric sulphate and aqueous ammonia is used instead of sodium hydroxide. The blue organic solution is loaded into the autoclave and 4 g. of oildag (10% paste of colloidal graphite in an oil matrix) is added. The temperature is held at 200° C. for 1 hour. A heavy deposit of powder is found in the autoclave. The filtered cold solution does not continue to form powder, although it contains a little dissolved copper.

EXAMPLE 9

Crystalline cupric pivalate is prepared from Versatic 5 (commercial 2,2-dimethylpropanoic acid) by using a solution of this in Shellsol T with aqueous cupric sulphate and adding alkali, separating off the organic phase and allowing it to stand. A dilute solution of cupric pivalate is placed in a special cell in a recording spectrophotometer and a pressure of 300 p.s.i. of hydrogen is maintained automatically. The temperature of the cell is slowly raised while the optical density due to the copper in solution is recorded. At 130° C. reduction begins to occur and the temperature is held at this value. After about 10 minutes the optical density suddenly increases because powder is formed in the clear solution. The copper originally in solution is precipitated quantitatively.

EXAMPLE 10

Stage 1

A mixture of 404 cc. of Versatic 911 and 800 cc. of Shellsol T is shaken with 150 cc. of 6 N ammonia and the aqueous layer removed. The organic liquid is mixed with 1 litre of 1 molar ferrous sulphate solution in water, using a mechanical stirrer so designed that no significant emulsification occurs. More ammonia is added to increase the amount of iron extracted into the organic phase. After separation the aqueous phase contains ammonium sulphate and ferrous iron which can be removed by extraction with fresh organic phase. In a number of experiments the concentration of iron in the organic phase has varied between 20.4 g. Fe(III)+1.25 g. Fe(II) and 35.0 g. Fe(III)+15 g. Fe(II) per litre.

Stage 2

The organic phase is sealed in an autoclave after adding 5 g. of oildag. Gaseous ammonia is admitted until the presence reaches 60 p.s.i.; the stirrer is started and the pressure falls to 10 p.s.i. More ammonia is admitted until the pressure reaches 60 p.s.i., and on stirring it falls to 20 p.s.i. After heating to 200° C. hydrogen is admitted until the pressure has risen by 350 p.s.i. When the reduction has become slow (1 hour), as shown by the rate of pressure drop, the vessel is cooled, the stirrer is stopped and after a few minutes to allow solid to settle, the liquid is discharged, leaving all solids in the autoclave. Fresh organic phase, loaded with dissolved iron, is admitted and the reduction cycle is repeated, precipitation occurring (over a period varying between 1 and 4 hours in different runs) on the solid already present so that no additional seed is required. After discharge from the autoclave the organic liquid generally contains about 5 to 8 g./l. of iron (ferrous and ferric), and ammonia in excess of that required to neutralize the acid formed during the reduction. It is re-loaded with iron in the manner described as Stage 1.

Stage 3

After eleven batches of the iron-containing organic liquid have been reduced as described in Stage 2 the solid is discharged from the autoclave as well as the liquid. The clear liquid is poured through a vacuum filter while the solid is held back by a permanent magnet, the slurry is then filtered and the solid washed with Shellsol T and then acetone. The solid is dried at 350° C. in an atmosphere of hydrogen for 1 hour, and the powder cooled and stored under nitrogen.

EXAMPLE 11

The process described in Example 10 is repeated exactly except that (i) only five batches of solution are reduced before the solid is removed and (ii) the solid is dried at 550° C. for 1 hour in hydrogen. The iron has sintered and analysis gives 99.3% Fe.

EXAMPLE 12

120 cc. of EHPA in 1080 cc. of Shellsol T was added to a slurry made by adding 150 cc. of 5 N sodium hydroxide solution to 500 cc. of 1 M nickel sulphate solution. The mixture is agitated mechanically and another 50 cc. of the sodium hydroxide is added slowly until all the nickel hydroxide has dissolved in the organic liquid.

After separation from the aqueous layer, the organic nickel solution is sealed in an autoclave with 5 g. of oildag, heated to 20° C. and maintained at that temperature for 3 hours after admitting 350 p.s.i. of hydrogen. After cooling the solid product is separated from the almost colourless liquid and is washed with Shellsol T and then with acetone. The air-dried pale grey powder is strongly magnetic and contains 50% nickel.

EXAMPLE 13

120 cc. of EHPA in 1080 cc. of Shellsol T are added to 1 litre of 1 M ferrous sulphate and 100 cc. of 10% 1-ascorbic acid. 5N sodium hydroxide solution is added to cause extraction of iron by the organic phase. A small amount of a third liquid phase forms during the extraction and this is made to redissolve in the bulk of the organic liquid by adding just sufficient 2-ethyl hexanol.

The red-brown organic iron solution is sealed in an autoclave with 5 g. of oildag and maintained at 200° C. for 2 hours with 350 p.s.i. of hydrogen present. After cooling the solution is grey but no solid has deposited. The reduced organic liquid from G still containing suspended carbon, is replaced in the autoclave, ammonia is admitted until the pressure reaches 40 p.s.i. The vessel is maintained at 200° C. for 3 hours with 350 p.s.i. of hydrogen present. After cooling the solution is brown-black and contains some powder.

The autoclave is re-sealed and ammonia admitted until the pressure reaches 70 p.s.i., the temperature is held at 200° C. for 3 hours with 350 p.s.i. of hydrogen present. The liquid is straw yellow and the solid iron-containing product is pale grey, non-magnetic.

EXAMPLE 14

Alamine 336 is made by General Mills, a tertiary amine, essentially straight chains, mainly $C_8$, some $C_{10}$. 100 cc. of amine, 400 cc. of Shellsol T and 10 cc. of 2-ethyl hexanol are mixed with 1 litre of 4% sulphuric acid containing 0.5 g. atom of uranium, added as uranyl sulphate. Immediate extraction occurs and the yellow organic phase is separated and placed in an autoclave with 5 g. of oildag. The temperature is held at 200° C. for 3 hours with 350 p.s.i. of hydrogen present. After cooling the solution contains black uranium-containing powder.

EXAMPLE 15

To the organic phase, consisting of 360 cc. of tributylphosphate, 780 cc. of Shellsol T and 60 cc. of 2-ethylhexanol, is added a solution made by mixing 500 cc. of 2 molar sodium metavanadate in water, and 750 cc. of 10 N hydrochloric acid. After mixing and standing for some time the brown-red organic layer is separated and sealed in an autoclave with 5 g. of oildag and held at 200° C. for 3 hours with 350 p.s.i. of hydrogen. After cooling the pale green vanadium-containing powder which has been produced is separated, washed with Shellsol T followed by acetone, and dried.

EXAMPLE 16

1200 cc. of a mixture of composition 30% tributyl phosphate, 66% Shellsol T and 4% 2-ethylhexanol is stirred with 1 litre of 1 molar aqueous cobaltous sulphate in 8 molar hydrochloric acid. Three phases are produced, one aqueous and two organic, showing that the amount of the alcohol present is not sufficient to make the cobalt chloride-tributylphosphate complex readily soluble in the aliphatic hydrocarbon. The water layer is removed and the two organic phases are sealed in an autoclave with 5 g. of oildag. The temperature is held at 200° C. for 3 hours with 350 p.s.i. of hydrogen pressure. A dark grey cobalt-containing powder is produced, which is washed with Shellsol T followed by acetone.

EXAMPLE 17

The solvent is an 0.4 molar solution of di-sec. $C_{10}$ alkyl methyl sulphonium chloride in 1,2-dichloroethane. 150 cc. of this is mixed with 100 cc. of 1 molar cobaltous sulphate in 8 molar hydrochloric acid. The green organic phase is removed and sealed in an autoclave (of 300 cc. capacity) with 1 g. of oildag. The temperature is held at 200° C. for 1 hour at 350 p.s.i. of hydrogen pressure. The green-blue cobalt-containing powder produced is filtered and washed with dichloroethane.

EXAMPLE 18

Aliquat 336 is the methyl quaternary ammonium chloride made from Alamine 336 by General Mills. 120 cc. of Aliquat 336, 36 cc. of 2-ethyl hexanol and 1044 cc. of Shellsol T are mixed to produce the organic phase which is added to 500 cc. of 1 molar aqueous sodium tungstate solution. After mixing for about 1 hour and standing to permit phase disengagement, the organic layer is separated and sealed in an autoclave with 5 g. of oildag. The temperature is held at 200° C. for 3 hours with 350 p.s.i. of hydrogen pressure. A tungsten-containing powder is produced.

I claim:
1. A process for the deposition of a metal value which comprises contacting with a reducing gas a liquid organic medium containing in solution a metal species in a complex or a compound of a carboxylic acid extractant, said extractant being substantially non-reducible under the reaction conditions, to cause precipitation of a metal value from the organic phase, there also being present in the liquid organic medium, when the metal species is more electropositive than cadmium, an acid acceptor.
2. A process according to claim 1, wherein the metal falls within Group I(b) of the Periodic Table.
3. A process according to claim 2, wherein the metal is copper.
4. A process according to claim 1, wherein the metal falls within Group VIII of the Periodic Table.
5. A process according to claim 4 wherein the metal is iron, cobalt or nickel.
6. A process according to claim 1, wherein the metal is cadmium, vanadium, uranium, molybdenum or tungsten.
7. A process according to claim 1, wherein the reducing gas is hydrogen.
8. A process according to claim 1, wherein the liquid organic medium comprises an alcohol of low water solubility.
9. A process according to claim 1, wherein the liquid organic medium comprises an excess of the organic extractant.
10. A process according to claim 1, wherein the liquid organic medium comprises an organic diluent different from the organic extraction.
11. A process according to claim 10, wherein the diluent is a hydrocarbon.
12. A process according to claim 1, wherein the metal species is more electropositive than cadmium and ammonia is used as an acid acceptor.
13. A process according to claim 1, wherein the metal species is more electropositive than cadmium and an organic amine is used as an acid acceptor.
14. A process according to claim 1, in which a seed material is present.
15. A process according to claim 1, in which the reaction is carried out at elevated temperature and pressure.
16. A process according to claim 15, in which the reaction is carried out at a temperature about 115° C.
17. A process according to claim 15, in which the reaction is carried out at a pressure above 200 lbs. per sq. in.
18. A process according to claim 1, in which the carboxylic acid extractant contains at least 9 carbon atoms per molecule.
19. A process according to claim 18, in which the carboxylic acid extractant contains from 9 to 11 carbon atoms per molecule.
20. A process according to claim 19, in which the carboxylic acid extractant comprises a tertiary carboxylic acid.
21. A process for the recovery of a metal value from an aqueous solution thereof which comprises solvent-extracting the aqueous solution with a substantially non-reducible, carboxylic acid extractant, separating the organic phase containing in solution the metal in the form of a complex or compound with the extractant and recovering a metal value therefrom by contacting the organic phase with a reducing gas to cause precipitation of the metal value, there being also present in the organic phase during the reduction, when the metal species is more electropositive than cadmium, an acid acceptor.

References Cited
UNITED STATES PATENTS

| 3,224,873 | 12/1965 | Swanson. | |
| 3,061,424 | 10/1962 | Nitesche et al. | 75—108 |
| 3,104,971 | 9/1963 | Olson et al. | 75—108 |
| 3,193,381 | 7/1965 | George et al. | 75—108 |
| 3,194,652 | 7/1965 | Clifford et al. | 75—108 |
| 3,251,646 | 5/1966 | Alon et al. | 75—119 |

L. DEWAYNE RUTLEDGE, Primary Examiner

W. W. STALLARD, Assistant Examiner

U.S. Cl. X.R.

75—108, 117, 118, 119, 121

UNITED STATES PATENT OFFICE
CERTIFICATE OF CORRECTION

Patent No. 3,532,490     Dated October 6, 1970

Inventor(s) Alfred R. Burkin

It is certified that error appears in the above-identified patent and that said Letters Patent are hereby corrected as shown below:

Example 12, column 6, line 10, change "20° C." to --200° C--.

Signed and sealed this 28th day of December 1971.

(SEAL)
Attest:

EDWARD M. FLETCHER, JR.
Attesting Officer

ROBERT GOTTSCHALK
Acting Commissioner of Patents